Sept. 16, 1958 J. G. SCHOTTHOEFER 2,851,696
VENTILATING CONTROL MEANS FOR WATER CLOSETS OR TOILETS
Filed Nov. 2, 1955 3 Sheets-Sheet 2
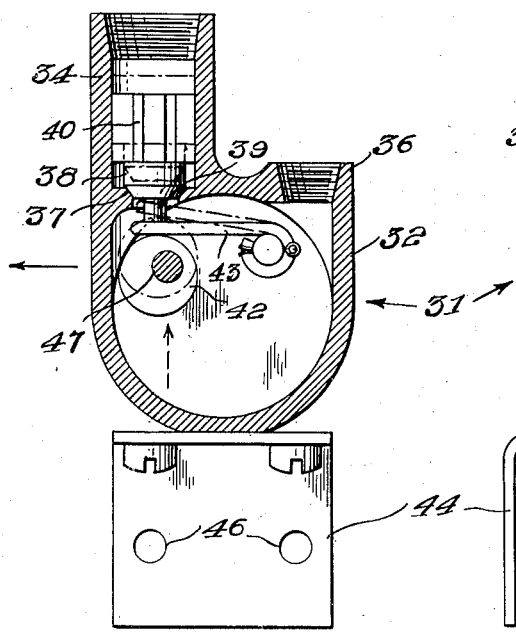
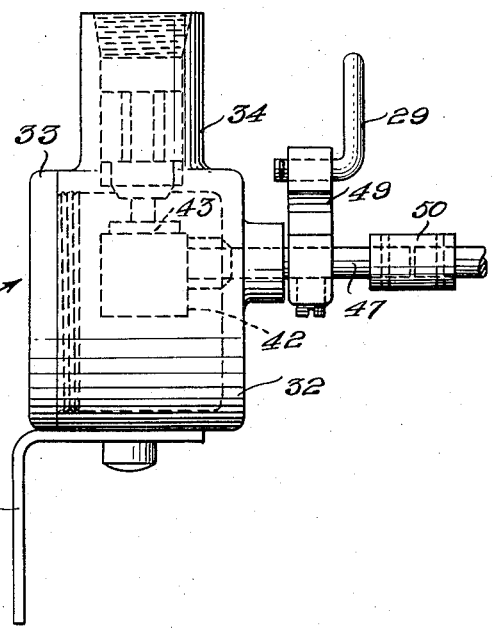
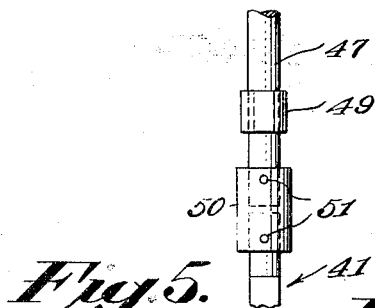
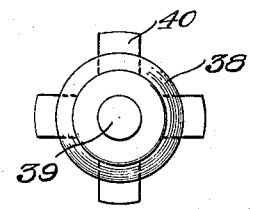
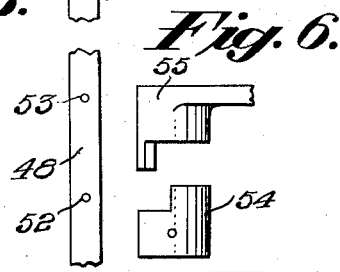
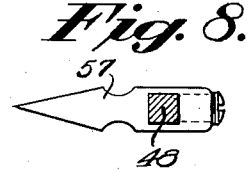
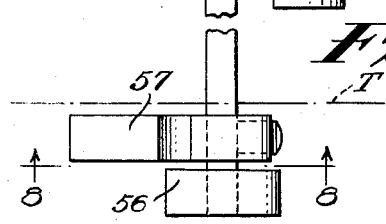
INVENTOR
Joseph G. Schotthoefer
BY James Cushing
ATTORNEY

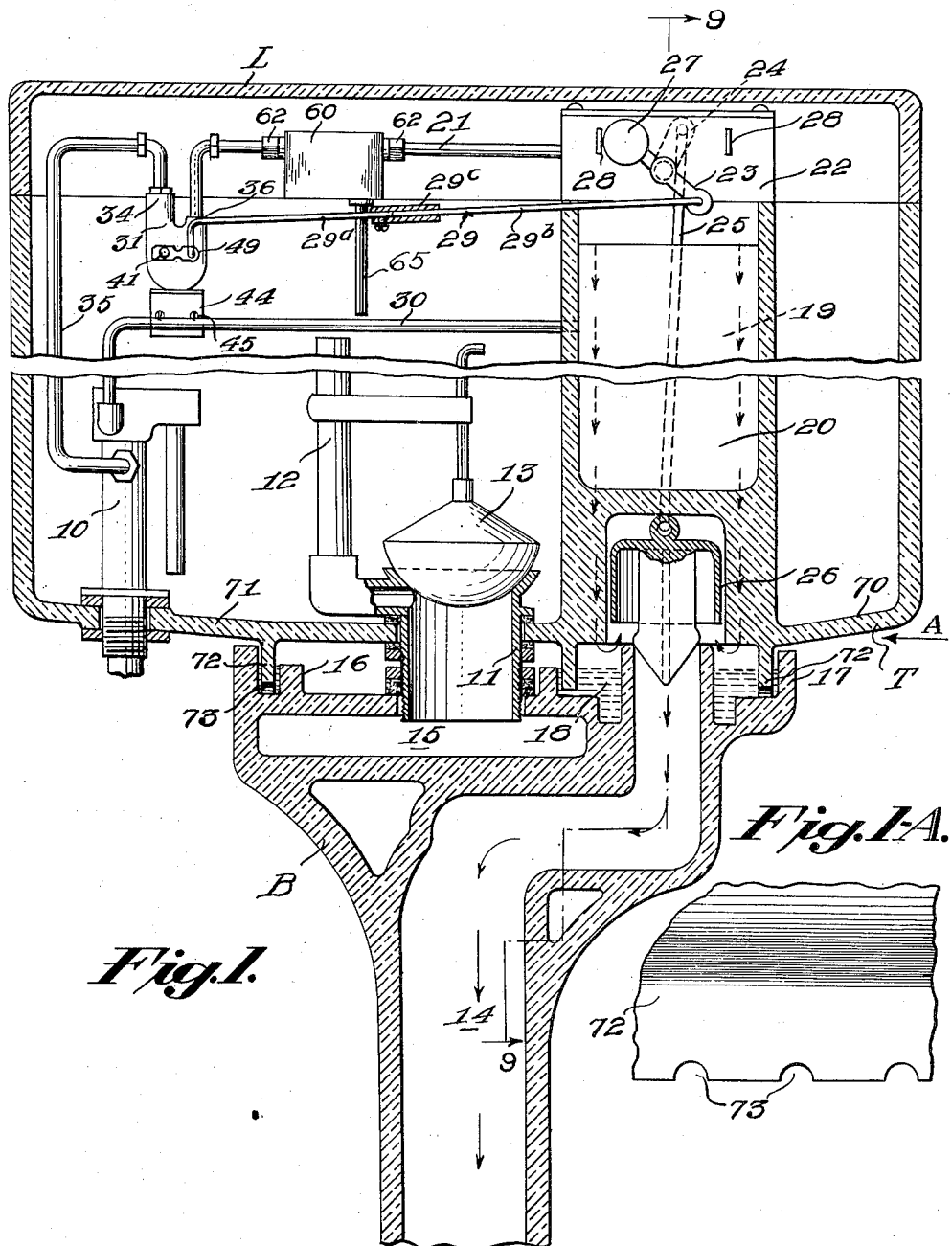

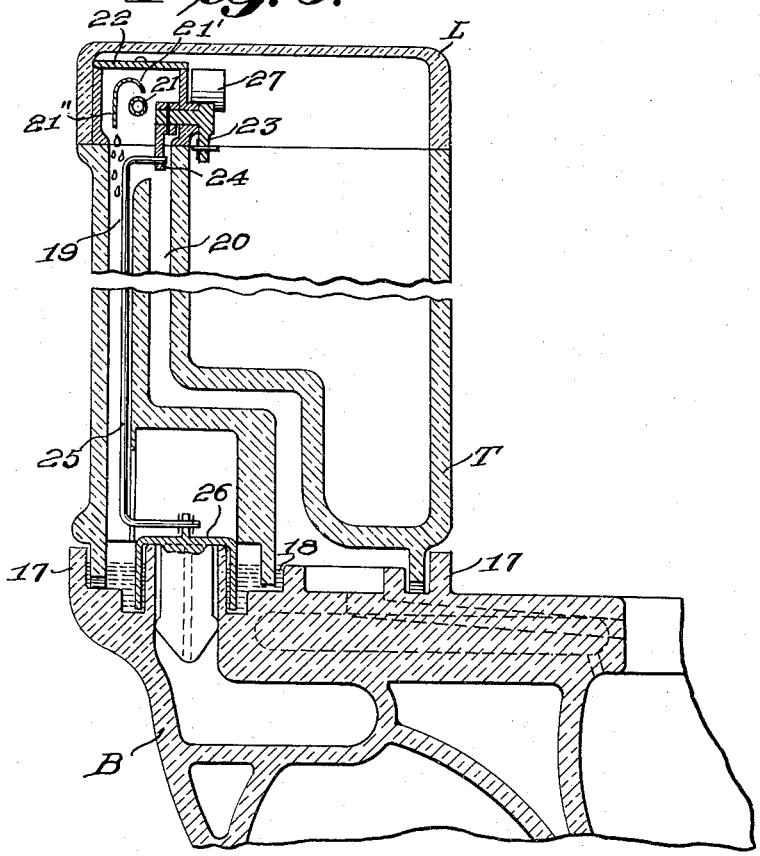
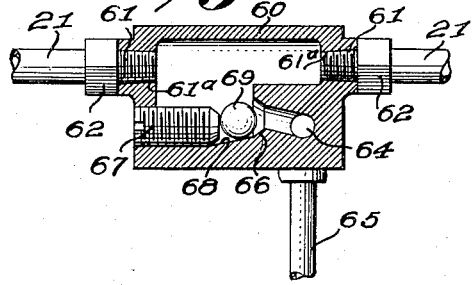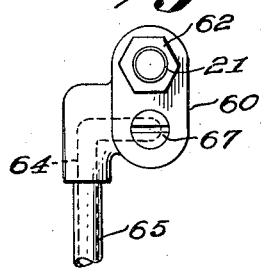

United States Patent Office 2,851,696
Patented Sept. 16, 1958

2,851,696

VENTILATING CONTROL MEANS FOR WATER CLOSETS OR TOILETS

Joseph G. Schotthoefer, Detroit, Mich.

Application November 2, 1955, Serial No. 544,391

4 Claims. (Cl. 4—216)

This invention relates to ventilating control means for water closets or toilets.

The invention is more particularly concerned with an improved water flow control valve and operating means therefor, which means also functions to control communication between foul gas channels, as a substitution for the water flow control valve and operating means disclosed in my Patents No. 2,309,925, February 2, 1943, and No. 2,395,236, February 19, 1946, and of which patents the present invention is an improvement.

The ventilated toilet according to the disclosures in said patents comprises modified bowl and tank structures whereby the bowl comprises an air inlet chamber and a foul gas outlet chamber, and the tank comprises a pair of vertical channels adjacent its rear wall whose lower ends communicate with said chambers. A housing is provided adjacent the top of the tank. A tube extends through the housing and is provided with a plurality of water-discharge apertures therein disposed above one of said channels, and which tube is in communication with a water flow control valve.

Furthermore, valve means are provided for checking flow of foul gases in said channels, and which is opened simultaneously with said valve during a ventilating operation by common manual means.

As is fully set forth in said patents, successive water drops from said tube descend in one of said channels with a resulting vacuum which causes foul gases to ascend in the other channel and be carried by said water drops into the associated chamber in the bowl for discharge therefrom.

In accordance with the disclosures in said patents, the water flow control valve includes a casing having inlet and outlet ports, a valve seat, a vertical stem having a valve cooperable with said seat and lever and cam means externally of the valve for imparting movement to said stem, and which means is operable by a shaft actuatable by a handle externally of the tank. Furthermore, the said foul gas control valve means is operated by the said control means.

A primary object of the present invention is an improved water flow control valve wherein the handle actuatable shaft extends directly into the valve casing and is therein provided with a simple cam for operating the valve.

A further object of the invention is improved and highly simplified means for jointly operating the water flow control valve and the foul gas flow control valve means.

Furthermore, the apertured tube above referred to, in accordance with the disclosure in said patents, was subject to inefficient operation due to the collection of lint or other foreign material in the apertures which for their intended purpose are relatively small.

It is accordingly a further object of the invention to provide an automatically operable suction or siphon valve member which is in communication with the pipe, whereby the apertures in said pipe remain free of the collection of foreign matter with a corresponding greater efficiency in the ventilating operations.

Furthermore, the structures according to the patent disclosures, in common with most toilets, were subject to sweating and since the side walls of the tank are vertical and overhang the bowl, such sweating resulted in drops of water falling onto the floor.

It is accordingly a further object of the invention to provide a tank structure whereby the sweat drops or condensation are automatically collected in the bowl.

Other objects and advantages of the invention will become apparent in the course of the following detailed description, taken in connection with the accompanying drawings, wherein:

Figure 1 is a vertical sectional view corresponding to Fig. 1 of my said Patent No. 2,395,236 and showing the present invention associated with the ventilated toilet disclosed therein.

Fig. 1–A is a fragmental elevational view as observed in the direction of the arrow A in Fig. 1.

Fig. 2 is a vertical sectional view of the improved water flow control valve as observed in a plane normal to the valve operating shaft.

Fig. 3 is a side elevational view of the valve as observed from the left of Fig. 2.

Fig. 4 is a bottom plan view of the valve per se.

Fig. 5 is a broken top plan view of the water plan control valve and the foul gas plan control valve-operating shaft.

Fig. 6 is a broken top plan view of the ball-actuating arm.

Fig. 7 is a plan view of an abutment sleeve.

Fig. 8 is a vertical sectional view in the plane of line 8—8 of Fig. 5.

Fig. 9 is a vertical sectional view as observed in the planes of broken line 9—9 on Fig. 1.

Fig. 10 is a longitudinal vertical sectional view of a siphon valve member incorporated in the ventilating system.

Fig. 11 is an elevational view as observed from the left end of Fig. 10.

Referring now in detail to the drawings and first to Fig. 1 thereof, B designates a toilet bowl having supported thereon a tank T which is provided with a lid L.

The usual ball cock is designated at 10, the water discharge nipple at 11, the overflow stand pipe at 12, and the water flow control ball at 13.

The bowl B includes the usual flush outlet 14, and the bowl is further provided with a chamber 15 communicating with the usual ported channel extending about the seat portion of the bowl.

The top portion of the bowl is provided with a vertical flange 16 which with flange 17 provides a water reservoir 18 for a purpose set forth in Patent No. 2,395,236.

In common with said patents, the ventilating means includes a water flow tube 21 which is provided with a plurality of perforations adjacent its free end, as in said Patent No. 2,395,236.

As indicated more clearly in Figs. 1 and 9, the tube 21 extends into a housing 22 with which communicate the upper ends of channels 19 and 20. The perforated end of the tube within housing 22 is disposed beneath the arched portion 21' of an apron 21" which functions to deflect the water from the perforations downwardly through channel 19.

Pivotally supported by the housing 22 is a lever arm 23 which is provided with an arm 24 to which the upper end of a rod 25 is connected, and the lower end of said rod is connected to a foul gas flow control valve 26. The said lever arm 23 is provided on one end thereof with a weight 27 alternately engageable with stops 28, and the opposite end of the lever arm is pivotally connected with one end of a rod 29.

The rod 29 is effective in one direction only or is in fact a push rod and not a pull rod. For this purpose, the rod comprises two sections 29ª and 29ᵇ, to the former of which is connected a sleeve 29ᶜ into which the adjacent end of section 29ᵇ is freely slidable, said end engaging the end of section 29ª upon operation of section 29ᵇ.

A water line 30 interconnects ball cock 10 with channel 19 for a purpose set forth in Patent No. 2,395,236.

In Patent No. 2,309,925 foul gas flow is controlled by a hinged cover which is operated by a rod similar to rod 29 above referred to, and accordingly the present invention is applicable to the ventilating structure disclosed in each of said patents.

Referring now more particularly to Figs. 2 and 3, it will be noted that the improved water flow control valve 31 comprises a casing 32 of one piece construction except for a threaded closure member 33. The casing 32 is provided with an internally threaded inlet 34 for receiving one end of a water supply pipe 35 whose opposite end is in communication with said ball cock 10.

The casing is further provided with an internally threaded outlet 36 for receiving the adjacent end of said tube 21. The said inlet at its bottom end is provided with a valve seat 37 which is engaged by a valve 38 having a depending stem 39, and the valve 38 includes a unitary guide cage 40 which is vertically movable in the inlet 34. It is to be observed that the valve 38 seats under the action of gravity only, and accordingly such valve may properly be termed "a gravity valve."

A shaft 41 has one end thereof rotatably extended into said valve casing 32 and is rigid with a cam 42. An elongated cam follower 43 is pivotally supported within the casing 32 and has one end thereof disposed between said cam 42 and valve stem 39, whereby the valve is unseated by action of said cam and is seated by water pressure combined with gravity.

The valve casing is preferably provided with a bracket 44 by which same is secured to said tank T as by screw bolts 45 extended through apertures 46 in the bracket.

It will be seen that the improved valve 31 as above described is water-tight and will not require any packing, which is a distinct improvement over the valves disclosed in said patents.

As indicated in Fig. 5, the inner end portion 47 of shaft 41 is cylindrical, while the outer end portion 48 thereof is rectangular. Secured to the cylindrical portion of the shaft immediately outwardly of the valve casing 32 is an arm 49 to which the opposite end of said rod 29 is pivotally connected.

The shaft 41 may conveniently be of two parts whereby to embody the rectangular handle supporting shaft of said patents, and such parts are preferably connected by a sleeve 50 through which and the adjacent ends of the shaft parts are extended pins 51. The rectangular portion 48 of the shaft is provided with a pair of axially spaced apertures 52 and 53, the former of which receives a cotter for connecting a contacting sleeve 54 thereto, and a flush ball lifting lever 55 is loosely supportable on the shaft intermediate said sleeve and a cotter received within aperture 53 for the purpose set forth in Patent No. 2,309,925.

The outer end of shaft 41 is provided with an actuating handle 56, and immediately inwardly thereof is a pointer 57 which may cooperate with a dial on tank T which is indicated by the dot-and-dash line.

From the above, it will be appreciated that the ventilating operating structures of the said patents have been materially simplified and that an improved valve has been provided which requires no packing as do the valves disclosed in said patents.

As will be observed in both of said patents, the means for operating the water flow control valve and the channel control valve means comprise a handle actuatable shaft disposed externally of the water flow control valve, and having its inner end journaled in a valve supporting plate. An arm has one end thereof pivotally connected to said plate, and the opposite end of the arm is provided with a fork in which is disposed a cam carried by the shaft. The said arm is provided with means engageable with a depending valve stem for operating the valve upon rotation of said cam, and the cam is provided with an arm having connections to the foul gas control valve means.

In accordance with the present invention, the handle operable shaft 41 extends directly into the water flow control valve casing 32 for control of the valve 38 therein, and the shaft is provided with an arm 49 which is connected to the foul gas control valve means by the rod 29.

In operation of the improved structure, the pointer 57 is disposed in horizontal position to the left of shaft 41 when the valve and operating means is in normal non-ventilating position, as is indicated in Fig. 5, and in which position the arm 49 is disposed vertically.

For a ventilating operation, the shaft 41 is rotated clockwise through an angle of 90° with the pointer 57 disposed vertically upward and the arm 49 projecting horizontally to the right, as is indicated in Fig. 1.

The referred to suction or siphon valve in the particular embodiment disclosed is interposed in the tube 21 externally of housing 22 and is illustrated in detail in Figs. 10 and 11. The said suction or siphon valve comprises a casing 60 with which adjacent ends of tube 21 are in communication and the tube ends are threaded as at 61 for reception in tapped openings 61ª in opposite ends of the casing 60, and nuts 62 are threaded onto said ends and engage the end walls of the casing for securely binding the tube ends in position.

The casing 60 is provided with a port 64 with which communicates a tube 65 depending into tank T, as indicated in Fig. 1.

The casing is provided with a valve seat 66 at the inner end of port 64. A stud 67 is adjustably supported in the casing 60 and the casing is provided with a bottom wall 68 intermediate the said seat 66 and the inner end of stud 67, and the said wall slopes downwardly from the seat to the stud. A free floating ball valve 69 rests on said wall 68.

During a ventilating operation, water is forced into casing 60 and the force of the water moves the valve 69 into engagement with the seat 66 for full pressure effect of the water through the apertures in tube 21 within housing 22.

At the termination of the ventilating operation and release of pressure within the casing, valve 69 will roll to the position in Fig. 10, whereby the water left in tube 21 is free to drain into tank T, and such draining movement of the water causes vacuum within the casing which will cleanse the apertures in the tube 21. For effective operation of the suction or siphon valve, the transverse area of the bore in tube 21 should be twice the combined transverse areas of the tube 65 and the apertures in the tube 21.

As indicated at 70 and 71 in Fig. 1, the lower overhanging walls of tank T slope downwardly toward the bowl B for passage of condensation drops into the reservoir 18.

As indicated in Fig. 1–A, the lower edges of flanges 72 are provided with notches 73 for passage of water into the reservoir 18.

While I have disclosed my invention in accordance with a specific structural embodiment thereof, such is to be considered as illustrative only, and not restrictive, the scope of the invention being defined in the following claims.

What I claim and desire to secure by U. S. Letters Patent is:

1. In a ventilating toilet including a bowl and a tank supported thereon, a pair of valve-controlled channels in said tank communicating with said bowl, a water supply tube having an end thereof disposed above the upper end of one of said channels, said tube being in communication with atmosphere adjacent said end to provide upwardly directed suction-creating water jets, and valve means for controlling the supply of water to said tube; the improvement which comprises a suction valve operatively associated with said tube for siphoning same upon cessation of the flow of water therethrough by said valve means.

2. The structure according to claim 1, wherein said suction valve comprises a casing in communication with said tube, a valve-controlled port in said casing, a valve seat within said casing at one end of said port, said port being in communication with a depending tube, and a freely operable valve movable into contact with said valve seat by water pressure in said casing and being movable under action of gravity from said seat upon reduction of water pressure in said first tube.

3. The structure according to claim 2, wherein said casing is provided with a wall portion adjacent said seat which is inclined downwardly therefrom, said freely movable valve comprising a spherical member, and an adjustable stop in said casing having an inner valve-engaging end spaced from said seat a greater distance than the diameter of said spherical member.

4. In a ventilated toilet including a bowl and a tank supported thereon, a pair of vertical channels in said tank communicating with said bowl, valve means controlling said channels, a water supply tube having a ported end disposed above the upper end of one of said channels, a valve controlling the supply of water to said tube, and a flush handle actuated shaft for operating said valve; the improvement wherein said water supply control valve comprises a casing supported within said tank and having laterally opposed vertical inlet and outlet openings, a water supply pipe connected to the inlet opening, said water supply tube being connected to said outlet opening, a valve seat in said casing beneath said inlet opening, a valve member disposed above said seat and being normally engaged therewith by gravity, said flush handle actuated shaft extending into said casing, a cam on the inner end of said shaft and disposed beneath said valve member, a follower comprising an elongated member with one end thereof disposed between said valve member and said cam and with the other end thereof pivotally supported within said casing adjacent said outlet opening, said flush handle-actuated shaft comprising a pair of axially alined sections, one of said sections being cylindrical and extending into said valve casing, the other section being rectangular in cross section and to which a ball-lifting arm is secured, said cylindrical section being provided with an arm, an elongated rod for operating said channel-controlling valve means, said rod comprising a pair of axially alined sections, one of said sections being provided with a sleeve adjacent one end thereof and the opposite end being secured to said arm, and an adjacent end of the other section being freely disposed within said sleeve with the other end connected to said channel-controlling valve whereby said operating rod is operative in one direction only.

References Cited in the file of this patent

UNITED STATES PATENTS

| | | |
|---|---|---|
| 862,879 | Brown | Aug. 13, 1907 |
| 953,506 | Baum | Mar. 29, 1910 |
| 1,381,710 | Krantz et al. | June 14, 1921 |
| 1,450,663 | Christman | Apr. 3, 1923 |
| 1,647,334 | Bart | Nov. 1, 1927 |
| 2,180,296 | Kantor | Nov. 14, 1939 |
| 2,309,925 | Schotthoefer | Feb. 2, 1943 |
| 2,395,236 | Schotthoefer | Feb. 19, 1946 |
| 2,455,128 | Lenski | Nov. 30, 1948 |
| 2,769,459 | Birkness et al. | Nov. 6, 1956 |

FOREIGN PATENTS

| | | |
|---|---|---|
| 283,861 | Italy | Oct. 16, 1952 |